United States Patent [19]

Inomata et al.

[11] Patent Number: 5,639,845
[45] Date of Patent: Jun. 17, 1997

[54] METHOD FOR THE PREPARATION OF A FLUORINE-CONTAINING ORGANOPOLYSILOXANE

[75] Inventors: Hiroshi Inomata; Yasushi Yamamoto; Yasuo Tarumi; Noriyuki Koike; Kouichi Ishida, all of Gunma-ken, Japan

[73] Assignee: Shin-Etsu Chemical Co., Ltd., Tokyo, Japan

[21] Appl. No.: 551,339

[22] Filed: Nov. 1, 1995

Related U.S. Application Data

[63] Continuation-in-part of Ser. No. 336,118, Nov. 4, 1994, abandoned, which is a continuation of Ser. No. 257,313, Jun. 9, 1994, abandoned.

[30] Foreign Application Priority Data

Jun. 10, 1993 [JP] Japan .................. 5-138411

[51] Int. Cl.$^6$ .................. C08G 77/08
[52] U.S. Cl. .................. 528/15; 556/450; 556/479; 556/454; 556/462; 556/488
[58] Field of Search .................. 528/15; 556/479; 586/450, 488, 454, 462

[56] References Cited

U.S. PATENT DOCUMENTS

| | | | |
|---|---|---|---|
| 2,823,218 | 2/1958 | Speier et al. | 556/479 |
| 4,504,645 | 3/1985 | Melancon | 528/15 |
| 4,565,714 | 1/1986 | Koshar | 427/54.1 |
| 4,681,913 | 7/1987 | Evans et al. | 524/862 |
| 4,898,958 | 2/1990 | Kishita et al. | 556/448 |
| 5,004,792 | 4/1991 | Maxson | 528/15 |
| 5,013,800 | 5/1991 | Inoue | 525/477 |
| 5,233,071 | 8/1993 | Wilczek | 556/479 |
| 5,272,243 | 12/1993 | Nakashima et al. | 528/31 |
| 5,302,632 | 4/1994 | Maxson | 523/213 |
| 5,473,038 | 12/1995 | O'Lenick | 528/15 |

*Primary Examiner*—Melvyn I. Marquis
*Attorney, Agent, or Firm*—Millen, White, Zelano, & Branigan, P.C.

[57] ABSTRACT

A novel and very efficient method is disclosed for the introduction of perfluoroalkyl groups into an organopolysiloxane by utilizing the hydrosilation reaction with an organohydrogenpolysiloxane. Different from the conventional but inefficient hydrosilation reaction using a perfluoroalkyl-substituted ethylene as the olefin compound, the inventive method utilizes a propene-1 3-substituted by a perfluoroalkyl group compound as the olefin compound to react with an organohydrogenpolysiloxane by which a very high efficiency in the hydrosilation reaction can be obtained without side reactions which otherwise greatly decrease the yield of the desired perfluoroalkyl-containing organopolysiloxane product.

12 Claims, 7 Drawing Sheets

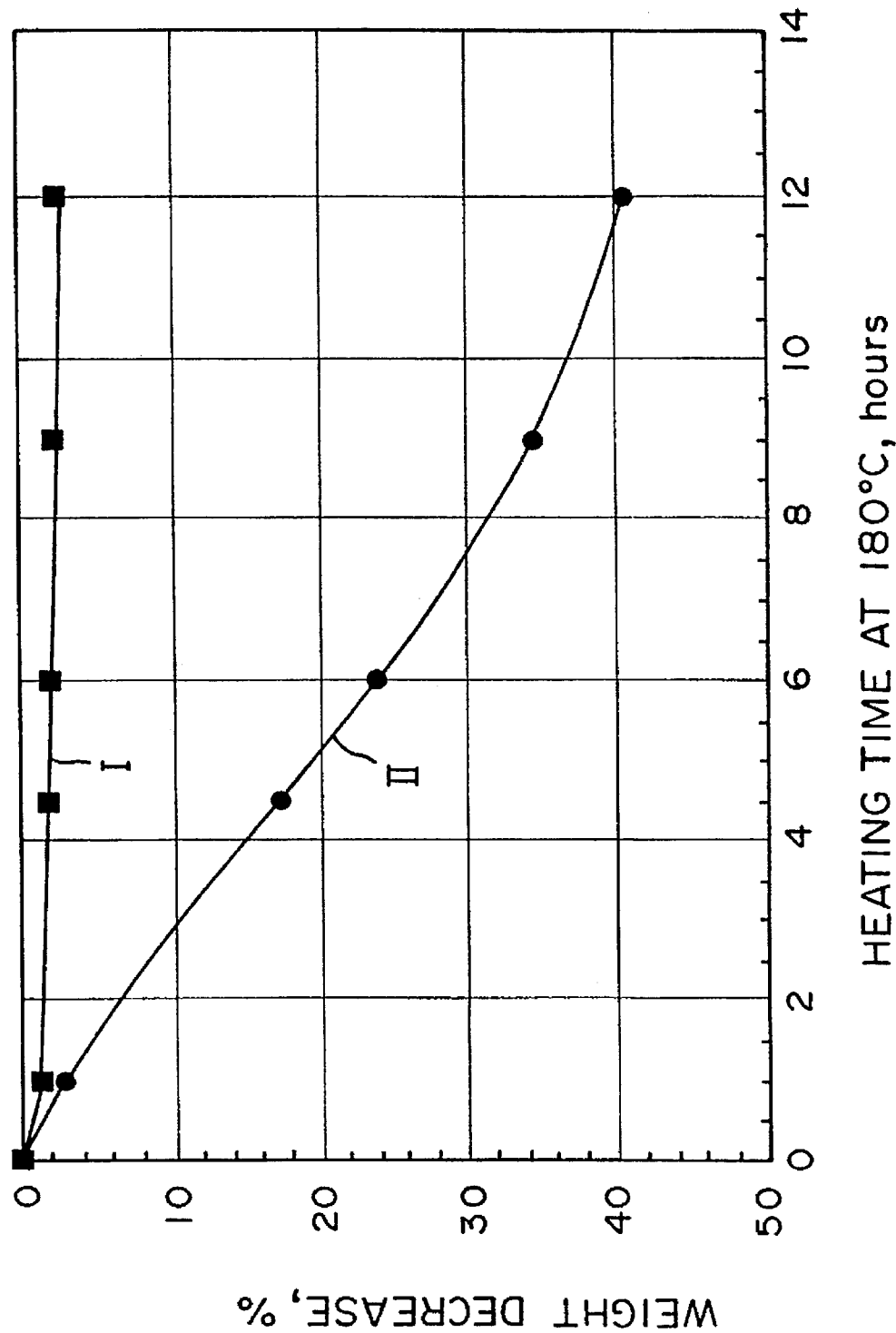

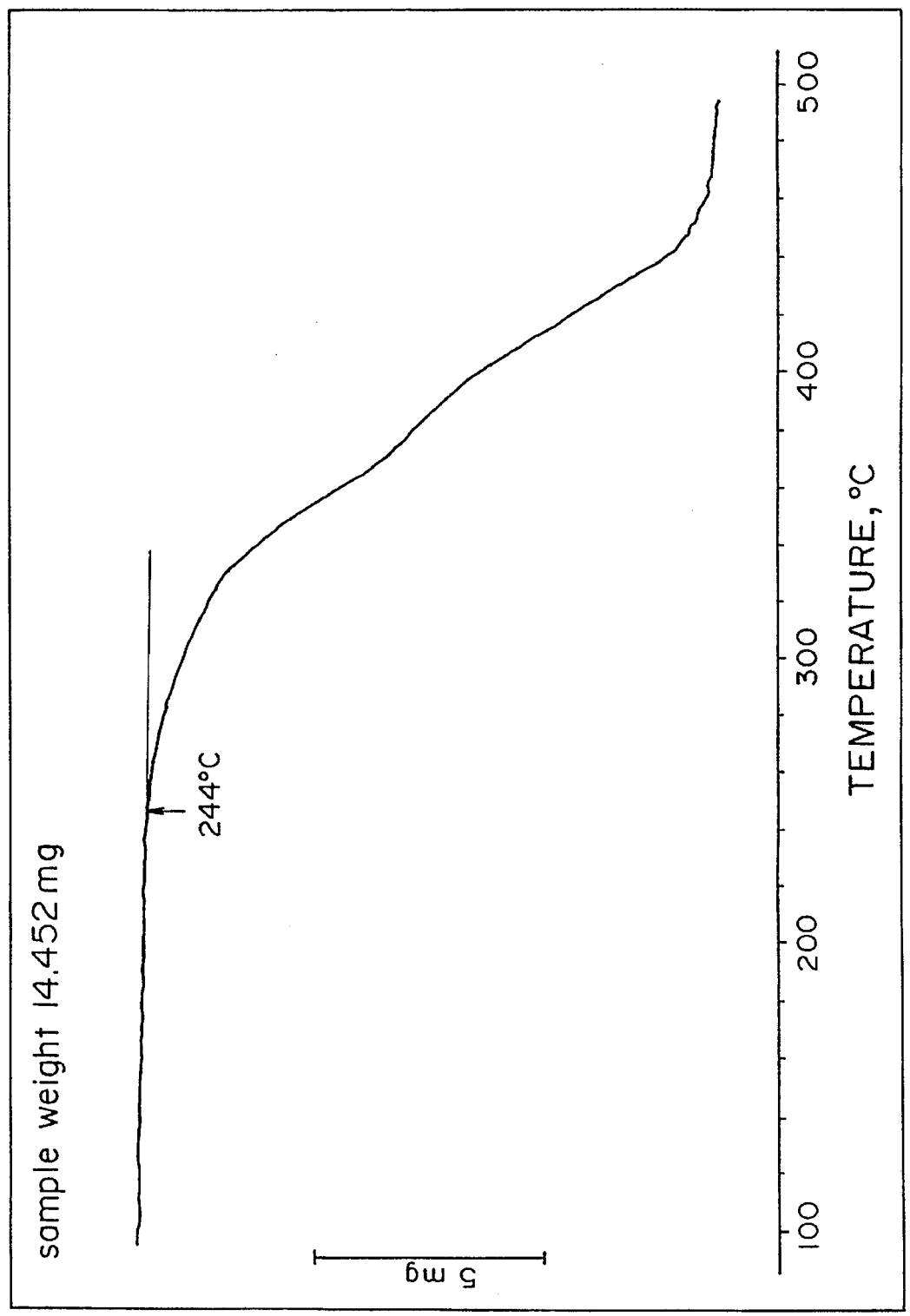

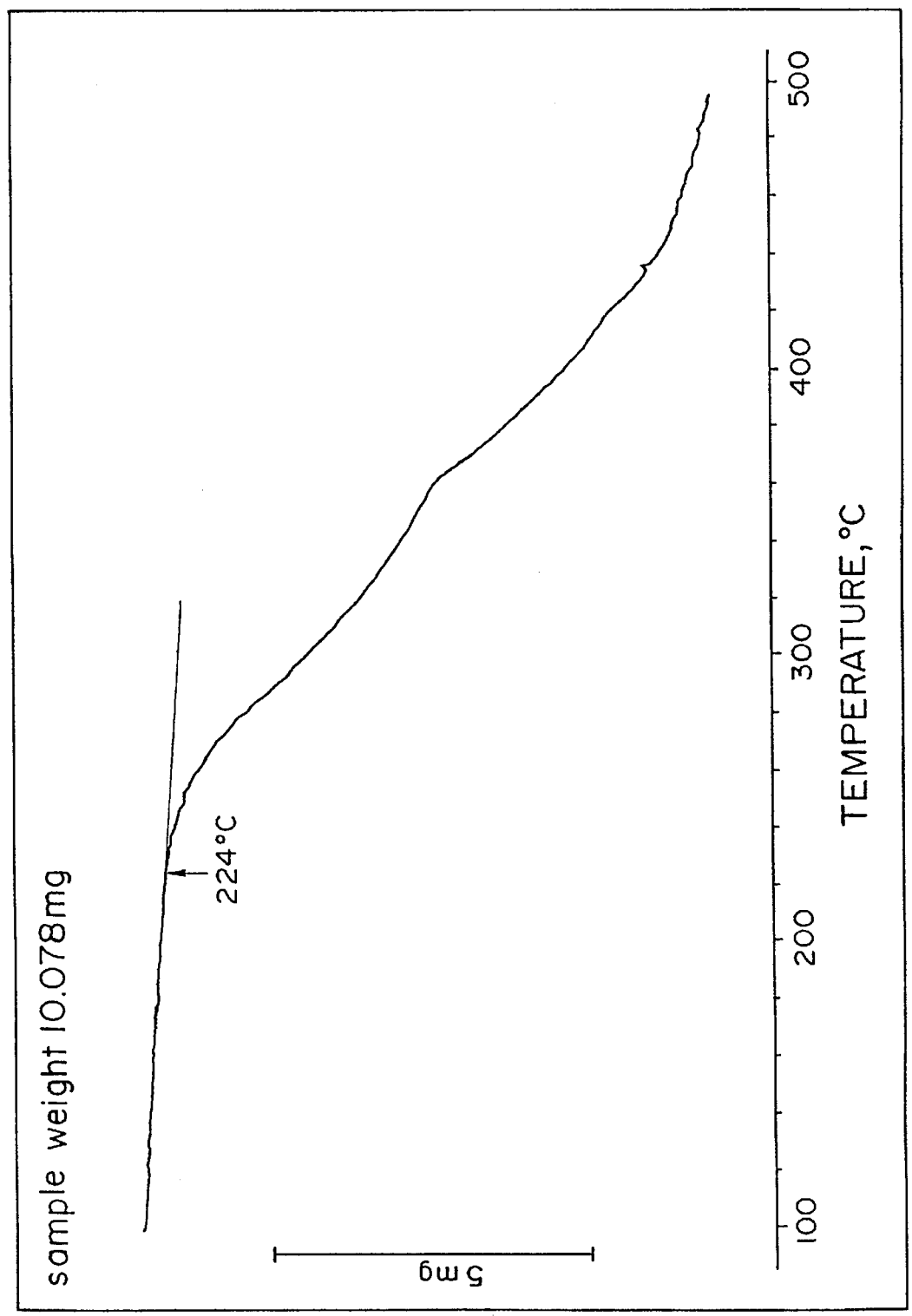

METHOD FOR THE PREPARATION OF A FLUORINE-CONTAINING ORGANOPOLYSILOXANE

This is a continuation-in-part application from a U.S. patent application Ser. No. 08/336,118 filed Nov. 4, 1994, which is a continuation application from a now abandoned patent application Ser. No. 08/257,313 filed Jun. 9, 1994 both of which are abandoned.

BACKGROUND OF THE INVENTION

The present invention relates to a method for the preparation of a perfluoroalkyl group-containing organopolysiloxane or, more particularly, to a method for the introduction of 3-(perfluoroalkyl)propyl groups into an organopolysiloxane, by which the content of fluorine in the product organopolysiloxane can be freely controlled.

As is well known, organopolysiloxanes having fluorinated hydrocarbon groups, e.g., 3,3,3-trifluoropropyl groups, bonded to the silicon atoms are widely used as the principal constituent of various kinds of silicone products by virtue of their unique properties not obtained in conventional organopolysiloxanes having unsubstituted hydrocarbon groups only as the organic groups.

Although various synthetic methods are possible as a means for introducing such fluorinated hydrocarbon groups into an organopolysiloxane, the only method industrially established heretofore utilizes the so-called hydrosilation reaction between a vinyl group and a hydrogen atom directly bonded to a silicon atom of a silicon compound. For example, a diorganopolysiloxane having a methyl 3,3,3-trifluoropropyl siloxane unit of the unit formula $(CH_3)(CF_3CH_2CH_2)SiO$ is prepared by first reacting 3,3,3-trifluoropropene-1 of the formula $CF_3CH=CH_2$ with methyl dichlorosilane of the formula $HSi(CH_3)Cl_2$ to give methyl 3,3,3-trifluoropropyl dichloro silane of the formula $CF_3CH_2CH_2Si(CH_3)Cl_2$ which is hydrolyzed to give a cyclic trimer 1,3,5-trimethyl-1,3,5-tris(3,3,3-trifluoropropyl)cyclotrisiloxane followed by the ring-opening polymerization thereof.

Generally, a 2-(perfluoroalkyl)ethyl group-containing organosilicon compound can be prepared by the hydrosilation reaction of a perfluoroalkyl ethylene of the formula $Rf—CH=CH_2$, in which Rf is a perfluoroalkyl group, with an SiH-containing organosilicon compound. For example, U.S. Pat. No. 4,898,958 corresponding to Japanese Patent Publication 3-75558 discloses a reaction of a perfluoroalkyl ethylene with methyl dichlorosilane to give a 2-(perfluoroalkyl)ethyl methyl dichlorosilane which is reacted with 1,3-dihydroxy-1,1,3,3-tetramethyl disiloxane to give a cyclic trisiloxane of 1-(2-perfluoroalkylethyl)-1,3,3,5,5-pentamethyl cyclotrisiloxane followed by a ring-opening polymerization reaction thereof to give a diorganopolysiloxane consisting of the siloxane units of the unit formula $—[(—SiMe_2—O—)_2—SiMe(CH_2CH_2Rf)—O—]—$, in which Me is a methyl group and Rf is a perfluoroalkyl group.

While the above mentioned hydrosilation reaction is applicable not only to an organosilane compound having an —SiH group but also to an organopolysiloxane compound provided that the compound has at least one silicon-bonded hydrogen atom, at any rate, the hydrosilation reaction for introducing a fluorinated hydrocarbon group into a silicon compound in the prior art is conducted solely by using the above mentioned perfluoroalkyl ethylene so that the fluorinated hydrocarbon group introduced into a silicon compound is limited to 2-(perfluoroalkyl)ethyl groups. The reaction of this type has a problem or disadvantage that the selectivity of the reaction is so low that only a part of the silicon-bonded hydrogen atoms can pertain to the hydrosilation reaction even by setting aside the problem that the fluorinated hydrocarbon group to be introduced into the silicon compound is limited to 2-(perfluoroalkyl)ethyl groups.

SUMMARY OF THE INVENTION

The present invention accordingly has an object to provide a novel method for introducing a fluorinated hydrocarbon group into an organosilicon compound or organopolysiloxane compound with greatly improved reliableness and efficiency when, in particular, the desired fluorinated hydrocarbon group to be introduced is a 3-(perfluoroalkyl)propyl group.

Thus, the method of the present invention for the preparation of an organopolysiloxane compound having a 3-(perfluoroalkyl)propyl group, which is represented by the general formula

$$Rf—CH_2CH_2CH_2—, \qquad (I)$$

Rf being a perfluoroalkyl group having from 1 to 10 carbon atoms, bonded to the silicon atom, comprises the steps of:

(a) blending an organohydrogenpolysiloxane having, in a molecule, at least one difunctional siloxane unit of the formula $RSi(H)O$, in which R is an alkyl group having 1 to 10 carbon atoms or a phenyl group, and a 3-substituted propene-1 compound represented by the general formula

$$Rf—CH_2—CH=CH_2, \qquad (II)$$

in which Rf has the same meaning as defined above, with admixture of a catalytic compound for the hydrosilation reaction to form a reaction mixture; and (b) heating the reaction mixture.

BRIEF DESCRIPTION OF THE DRAWING

FIG. 5 is a graph showing the weight decrease of the compounds prepared in Example 1 (curve I) and in Comparative Example 3) by heating at 180° C. in air as a function of the heating time.

FIGS. 6 and 7 are each a thermogravimetric record of the compounds prepared in Example 1 and Comparative Example 3, respectively.

DETAILED DESCRIPTION OF THE PREFERRED EMBODIMENTS

Figure 1:
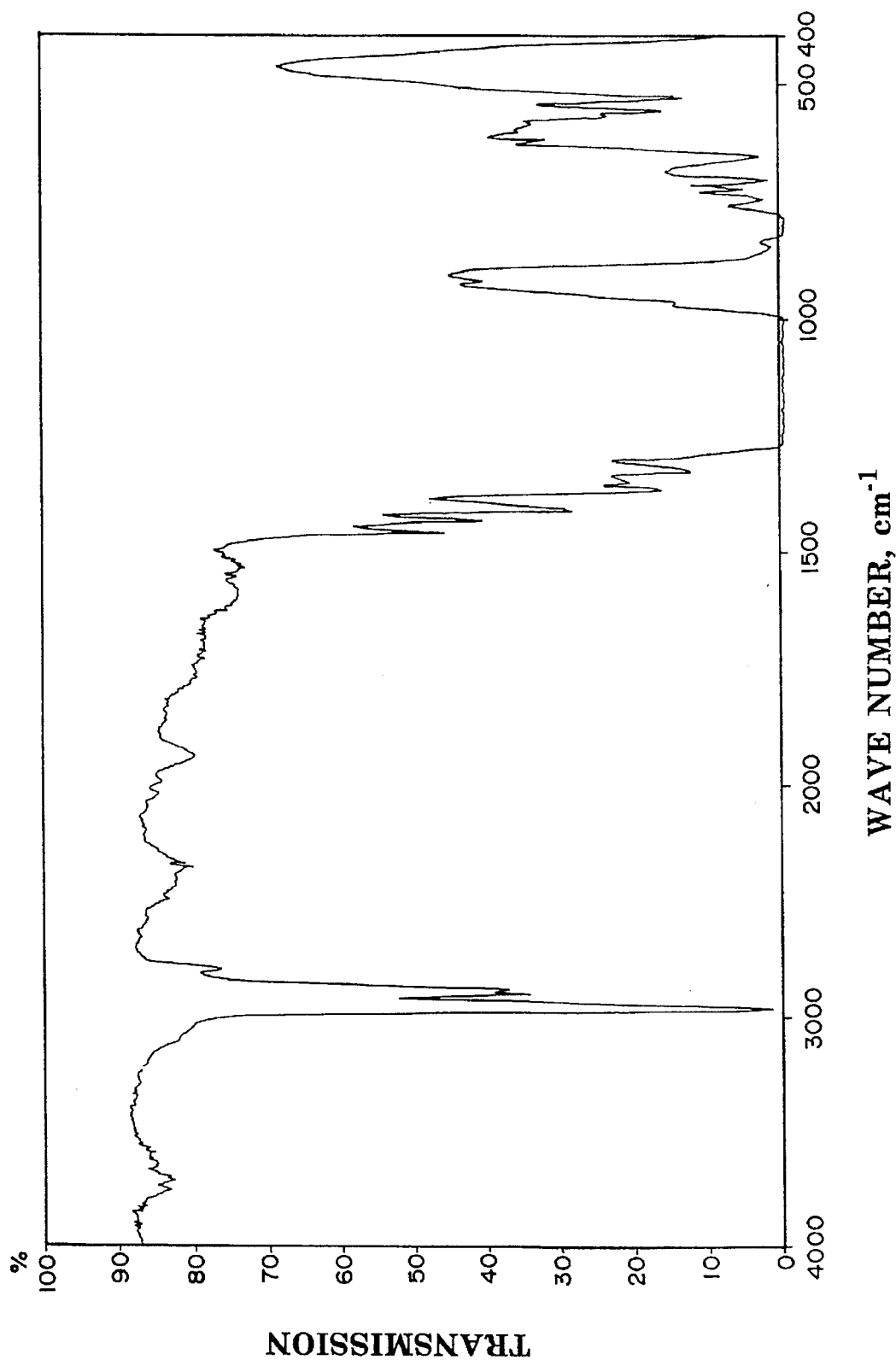
FIGS. 1, 2, 3 and 4 are each an infrared absorption spectrum of the perfluorooctyl group-containing organopolysiloxane prepared in Example 1, Example 2, Comparative Example 1 and Comparative Example 2, respectively.

As is described above, the inventive method comprises the steps (a) and (b), of which the step (a) is for the preparation of a reaction mixture by blending the reactants with admixture of a catalyst and the step (b) is for conducting the reaction to obtain an organopolysiloxane having a 3-(perfluoroalkyl)propyl group bonded to the silicon atom of the starting organopolysiloxane. It is a novel and quite unexpected discovery that the hydrosilation reaction between silicon-bonded hydrogen atoms in an organosilicon compound and a fluorinated olefin compound having a perfluoroalkyl group proceeds with high efficiency and good selectivity only when the fluorinated olefin compound having a perfluoroalkyl group is a 3-perfluoroalkylpropene-1 compound as is defined by the above given general formula (II) and the silicon atom in the organosilicon compound, to which a hydrogen atom is directly bonded, is a member of a difunctional siloxane unit forming an organopolysiloxane.

The starting organopolysiloxane as one of the reactants to be blended in step (a) of the inventive method with a 3-perfluoroalkyl propene-1 compound is a so-called organohydrogenpolysiloxane having, in a molecule, at least one difunctional siloxane unit of the unit formula RSi(H)O, in which R is an unsubstituted monovalent hydrocarbon group free from aliphatic unsaturation having 1 to 10 or, preferably, 1 to 8 carbon atoms exemplified by alkyl groups such as methyl, ethyl, propyl, isopropyl, butyl, tert-butyl, hexyl, cyclohexyl and octyl groups, aryl groups such as phenyl, tolyl and xylyl groups and aralkyl groups such as benzyl and 2-phenylethyl groups. The substituent groups bonded to the silicon atoms in the siloxane units other than the above mentioned RSi(H)O units in the organohydrogenpolysiloxane can be, besides the unsubstituted monovalent hydrocarbon groups having 1 to 10 carbon atoms free from aliphatic unsaturation denoted by R, a hydrolyzable group or atom including alkoxy groups, e.g., methoxy, ethoxy, propoxy and butoxy groups, and atoms of a halogen, e.g., chlorine and iodine. The molecular structure of the organohydrogenpolysiloxane is not particularly limitative including straightly linear, branched and cyclic ones. Examples of suitable organohydrogenpolysiloxanes include diorganopolysiloxanes of a linear molecular structure expressed by the formula

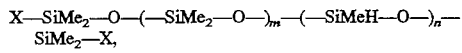

in which Me is a methyl group, X is a monovalent hydrocarbon group free from aliphatic unsaturation, e.g., methyl, or a hydrolyzable atom or group, e.g., halogen atoms and alkoxy groups, the subscript m is zero or a positive integer not exceeding 500 and the subscript n is a positive integer not exceeding 500, and cyclic organopolysiloxane oligomer consisting of 3 to 10 units of the unit formula MeHSiO.

The olefin compound to be reacted with the above defined organohydrogenpolysiloxane is an allyl compound represented by the above given general formula (II), in which the group denoted by Rf is a perfluoroalkyl group having 1 to 10 carbon atoms, the perfluoroalkyl group of the formula Rf is bonded to the allyl group directly. Examples of the perfluoroalkyl group of the formula Rf include: $C_2F_5-$, $C_4H_9-$, $C_6F_{13}-$, $C_8F_{17}-$, n-$C_3F_7-$, n-$C_3F_7-C(CF_3)_2-$, and $CF_3-CF(CF_3)-$, though not particularly limitative thereto.

As to the mixing proportion of the organohydrogenpolysiloxane and the perfluoroalkyl-containing olefin compound of the general formula (II) in the reaction mixture to perform the hydrosilation reaction, it is preferable that the amount of the perfluoroalkyl-containing olefin compound is in the range from 0.1 to 1.3 moles per mole of the silicon-bonded hydrogen atoms in the organohydrogenpolysiloxane. Needless to say, the amount of the olefin compound should be smaller than the stoichiometrically equivalent amount when a part of the silicon-bonded hydrogen atoms are to be left as unreacted while the amount thereof should be in some excess over the stoichiometric amount when it is desired to leave no silicon-bonded hydrogen atoms in the fluorine-containing organopolysiloxane as the product.

It is essential that the reaction mixture is admixed with a catalytic compound which is effective to promote the hydrosilation reaction between the aliphatically unsaturated linkages in an olefin compound and the silicon-bonded hydrogen atoms in the organohydrogenpolysiloxane. Examples of suitable catalytic compounds include compounds of a noble metal belonging to the VIIIth Group of the Periodic Table such as platinum, rhodium, ruthenium and palladium or, preferably, platinum. Particular platinum-based catalytic compounds include chloroplatinic acid, complexes of chloroplatinic acid with an olefin such as ethylene, an alcoholic compound or a vinyl siloxane compound. Catalytic compounds of metals other than platinum include those of the formulas: $RhCl(PPh_3)_3$, $RhCl(CO)(PPh_3)_2$, $RhCl(C_2H_4)_2$, $Ru_3(CO)_{12}$, $PdCl_2(PPh_3)_2$ and the like, in which Ph is a phenyl group. The amount of the catalytic compound is not particularly limitative depending on the desired reaction velocity but, usually, an amount of the catalytic compound in the range from $1\times10^{-3}$ to $1\times10^{-5}$ mole calculated as the noble metal element is sufficient per mole of the silicon-bonded hydrogen atoms in the reaction mixture.

Although the reaction mixture can be prepared from an organohydrogenpolysiloxane, a perfluoroalkyl-containing olefin compound and a catalytic compound, it is optional according to need that the reaction mixture is diluted by the addition of an organic solvent such as toluene, n-hexane, trifluoromethyl benzene, 1,3-bis(trifluoromethyl)benzene and the like, of which the last mentioned two fluorinated compounds are preferred in respect of the good solubility of both of the reactants therein.

The hydrosilation reaction between the reactants in the thus prepared reaction mixture proceeds by merely heating the reaction mixture under agitation. In particular, the organohydrogenpolysiloxane and the catalytic compound are first introduced together with an organic solvent, if desired, into a reaction vessel into which the perfluoroalkyl-containing olefin compound is gradually added dropwise taking, for example, 10 to 60 minutes at a temperature of 40° to 160° C. or, preferably, 80° to 130° C. followed by further continued agitation of the mixture at this temperature for 1 to 24 hours. The reaction can be performed in an atmosphere of air. After completion of the reaction, the reaction mixture is freed under reduced pressure from volatile matters including the unreacted olefin compound, if any, and the organic solvent, when used, to give the desired 3-(perfluoroalkyl) propyl-containing organopolysiloxane.

In the following, the advantages obtained by the method of the present invention is illustrated in more detail by way of examples and comparative examples.

EXAMPLE 1

Into a three-necked flask of 100 ml capacity equipped with a thermometer, Dimroth condenser and dropping funnel were introduced 5.93 g of a methyl hydrogen polysiloxane expressed by the formula

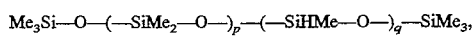

in which Me is a methyl group, the subscript p has a value of 95.6 as an average and the subscript q has a value of 43.4 as an average, 0.017 g of a 1% by weight toluene solution of a complex of chloroplatinic acid and 1,1,3,3-tetramethyl-1,3-divinyl disiloxane and 30.0 g of 1,3-bis(trifluoromethyl) benzene and the mixture in the flask was heated up to 100° to 110° C. under agitation by means of a magnetic stirrer.

In the next place, 15.0 g of 3-(perfluoro-n-octyl)propene-1 of the formula n-$C_8F_{17}-CH_2-CH=CH_2$ were added dropwise through the dropping funnel into the flask taking about 20 minutes and the reaction mixture was further agitated for about 19 hours by keeping the above mentioned temperature to complete the hydrosilation reaction. The amount of the olefin compound was 1.2 times of the stoichiometric amount relative to the silicon-bonded hydrogen atoms in the organohydrogenpolysiloxane.

After completion of the reaction, the reaction mixture was freed from the solvent and unreacted olefin compound by distillation to give 18.0 g of a reaction product.

The above mentioned yield of the reaction product of organopolysiloxane corresponds, by calculation from the amount of the starting methyl hydrogen polysiloxane, to a 99% conversion of the silicon-bonded hydrogen atoms in the starting methyl hydrogen polysiloxane into 3-(perfluoro-n-octyl)propyl groups. The reaction product was subjected to the infrared absorption spectrophotometric analysis to give the spectrum shown in FIG. 1, in which the strong absorption bands in the 900 to 1300 $cm^{-1}$ wave number region could be assigned to the C—F bond and the absorption band at 2950 $cm^{-1}$ could be assigned to the —$CH_3$ group while no absorption band at 2155 $cm^{-1}$ assignable to the Si—H bond could be detected, and the $^{19}$F-NMR and $^1$H-NMR analyses to give the results shown below.

| $^{19}$F-NMR ($\delta$, ppm, $CF_3COOH$) | |
|---|---|
| −5.1 | (s, $CF_3$—) |
| −38.2 | (s, $CH_2CF_2$) |
| −46.0 to −47.5 | (m, $CF_2$) |
| −51.3 | (s, $CF_3$—$CF_2$) |
| $^1$H-NMR ($\delta$, ppm, TMS) | |
| 0.26 | (m, $CH_3$) |
| 0.60 to 1.10 | (m, Si—$CH_2$—) |
| 1.23 to 2.76 | (m, $CF_2CH_2CH_2$) |

Thus, the reaction product obtained here could be assumed to be expressed by the formula

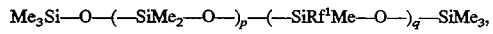

$$Me_3Si—O—(—SiMe_2—O—)_p—(—SiRf^1Me—O—)_q—SiMe_3,$$

in which Me, p and q each have the same meaning as defined above and $Rf^1$ is a 3-(perfluoro-n-octyl)propyl group.

The above prepared compound was subjected to the test of thermal stability in two ways. Thus, about 1 g portion of the compound was taken in an aluminum dish and kept in an hot-air oven controlled at 180° C. from which the sample was periodically taken out to determine the weight decrease. The results are shown in FIG. 5 by the curve I which indicates that the compound was very stable at this temperature at least for 12 hours.

Further, the compound was subjected to a thermogravimetric analysis in air at a rate of temperature elevation of 10° C./minute to give a record shown in FIG. 6, which shows that the thermal decomposition of the compounds started at about 244° C.

EXAMPLE 2

Into a three-necked flask of 100 ml capacity equipped with a thermometer, Dimroth condenser and dropping funnel were introduced 1.80 g of a methyl hydrogen polysiloxane expressed by the formula

$$Me_3Si—O—(—SiHMe—O—)_r—SiMe_3,$$

in which the subscript r has a value of 28.0 as an average, 0.017 g of a 1% by weight toluene solution of a complex of chloroplatinic acid and 1,1,3,3-tetramethyl-1,3-divinyl disiloxane and 30.0 g of 1,3-bis(trifluoromethyl) benzene and the mixture in the flask was heated up to 102° to 108° C. under agitation by means of a magnetic stirrer.

In the next place, 15.0 g of 3-(perfluoro-n-octyl) propene-1 of the formula n-$C_8F_{17}$—$CH_2$—CH=$CH_2$ were added dropwise through the dropping funnel into the flask taking about 20 minutes and the reaction mixture was further agitated for about 19 hours by keeping the above mentioned temperature to complete the hydrosilation reaction. The amount of the olefin compound was 1.2 times of the stoichiometric amount relative to the silicon-bonded hydrogen atoms in the organohydrogenpolysiloxane.

After completion of the reaction, the reaction mixture was freed from the solvent and unreacted olefin compound by distillation to give 13.9 g of a reaction product.

The above mentioned yield of the reaction product of organopolysiloxane corresponds, by calculation from the amount of the starting methyl hydrogen polysiloxane, to a 96% conversion of the silicon-bonded hydrogen atoms in the starting methyl hydrogen polysiloxane into 3-(perfluoro-n-octyl)propyl groups. Therefore, the reaction product could be assumed to be expressed by the formula

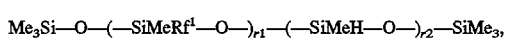

$$Me_3Si—O—(—SiMeRf^1—O—)_{r1}—(—SiMeH—O—)_{r2}—SiMe_3,$$

in which $Rf^1$ is a 3-(perfluoro-n-octyl)propyl group and the subscripts r1 and r2 have values of 26.9 and 1.1, respectively, each as an average.

Figure 2:
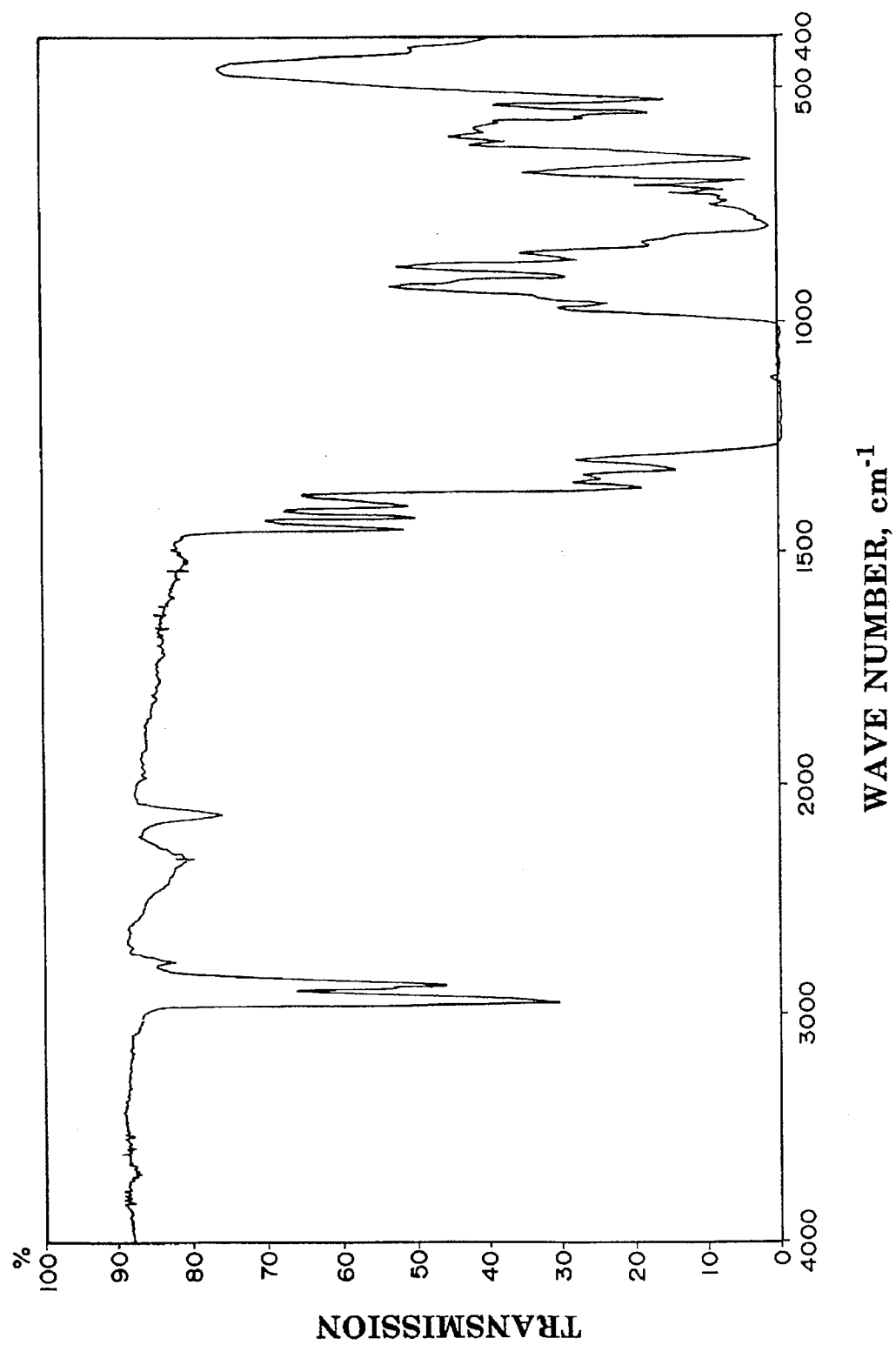

The reaction product was subjected to the infrared absorption spectrophotometric analysis to give the spectrum shown in FIG. 2, in which the strong absorption bands in the 900 to 1300 $cm^{-1}$ wave number region could be assigned to the C—F bond and the absorption band at 2950 $cm^{-1}$ could be assigned to the —$CH_3$ group while a weak absorption band at 2155 $cm^{-1}$ assignable to the Si—H bond could be detected, and the $^{19}$F-NMR and $^1$H-NMR analyses to give the results shown below.

| $^{19}$F-NMR ($\delta$, ppm, $CF_3COOH$) | |
|---|---|
| −5.1 | (s, $CF_3$—) |
| −37.5 | (s, $CH_2CF_2$) |
| −45.0 to −47.0 | (m, $CF_2$) |
| −50.1 | (s, $CF_3$—$CF_2$) |
| $^1$H-NMR ($\delta$, ppm, TMS) | |
| 0.25 | (m, $CH_3$) |
| 0.61 to 1.12 | (my Si—$CH_2$—) |
| 1.24 to 2.76 | (m, $CF_2CH_2CH_2$) |
| 4.86 | (m, SiH) |

COMPARATIVE EXAMPLE 1

The procedure for the experiment was substantially the same as in Example 1 except that the amount of the same organohydrogenpolysiloxane was decreased to 5.90 g and 15.0 g of 3-(perfluoro-n-octyl)propene-1 were replaced with 14.6 g of perfluoro-n-octyl ethylene corresponding to 1.2 times of the stoichiometrically equivalent amount to the silicon-bonded hydrogen atoms. By the removal of volatile matters from the reaction mixture after completion of the reaction, 9.5 g of a fluorine-containing organopolysiloxane were obtained. Although the analytical results indicated that the product organopolysiloxane contained no silicon-bonded hydrogen atoms, it was calculated that only about 30% of the silicon-bonded hydrogen atoms in the starting organohydrogenpolysiloxane pertained to the hydrosilation reaction with the olefin compound from the weight increase from 5.9 g to 9.5 g assuming a hydrosilation reaction alone disregarding the possibility of side reactions which had led to the loss of about 70% of the silicon-bonded hydrogen atoms in the starting organohydrogenpolysiloxane. One of the possibilities of such side reactions includes a reducing reaction of the perfluoro-n-octyl ethylene into 1-(perfluoro-n-hept-yl)-1-fluoropropene of the formula $C_7F_{15}-CF=CH-CH_3$.

Figure 3:
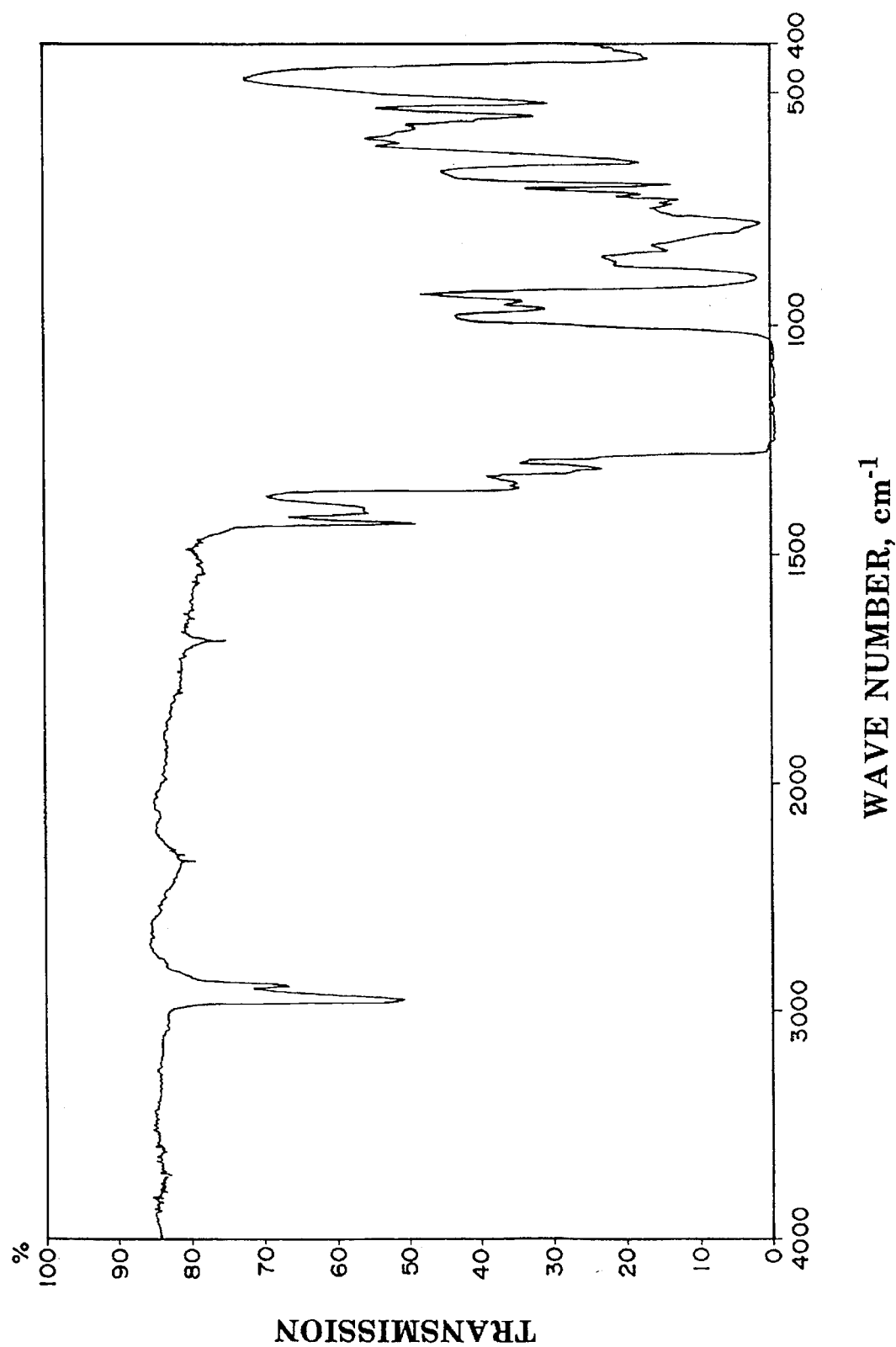

The infrared absorption spectrum of the here obtained product is shown in FIG. 3, in which no absorption band assignable to Si—H can be detected. The results of the NMR spectrometric analyses are shown below.

| $^{19}$F-NMR ($\delta$, ppm, $CF_3COOH$) | |
| --- | --- |
| −5.2 | (s, $CF_3-$) |
| −38.5 | (s, $CH_2CF_2$) |
| −44.5 to −47.5 | (m, $CF_2$) |
| −50.0 | (s, $CF_3-CF_2$) |
| $^1$H-NMR ($\delta$, ppm, TMS) | |
| 0.26 | (m, $CH_3$) |
| 0.96 to 1.23 | (m, Si—$CH_2-$) |
| 1.57 to 2.76 | (m, $CF_2CH_2$) |

COMPARATIVE EXAMPLE 2

The procedure for the experiment was substantially the same as in Example 2 except that the amount of the same organohydrogenpolysiloxane was increased to 3.6 g and 15.0 g of 3-(perfluoro-n-octyl)propene-1 were replaced with 29.2 g of perfluoro-n-octyl ethylene corresponding to 1.2 times of the stoichiometrically equivalent amount to the silicon-bonded hydrogen atoms. By the removal of volatile matters from the reaction mixture after completion of the reaction, 15.0 g of a fluorine-containing organopolysiloxane were obtained. Although the analytical results indicated that the product organopolysiloxane contained no silicon-bonded hydrogen atoms, it was calculated that only about 46% of the silicon-bonded hydrogen atoms in the starting organohydrogenpolysiloxane pertained to the hydrosilation reaction with the olefin compound from the weight increase from 3.6 g to 15.0 g assuming a hydrosilation reaction alone disregarding the possibility of side reactions which had led to the loss of about 54% of the silicon-bonded hydrogen atoms in the starting organohydrogenpolysiloxane.

Figure 4:
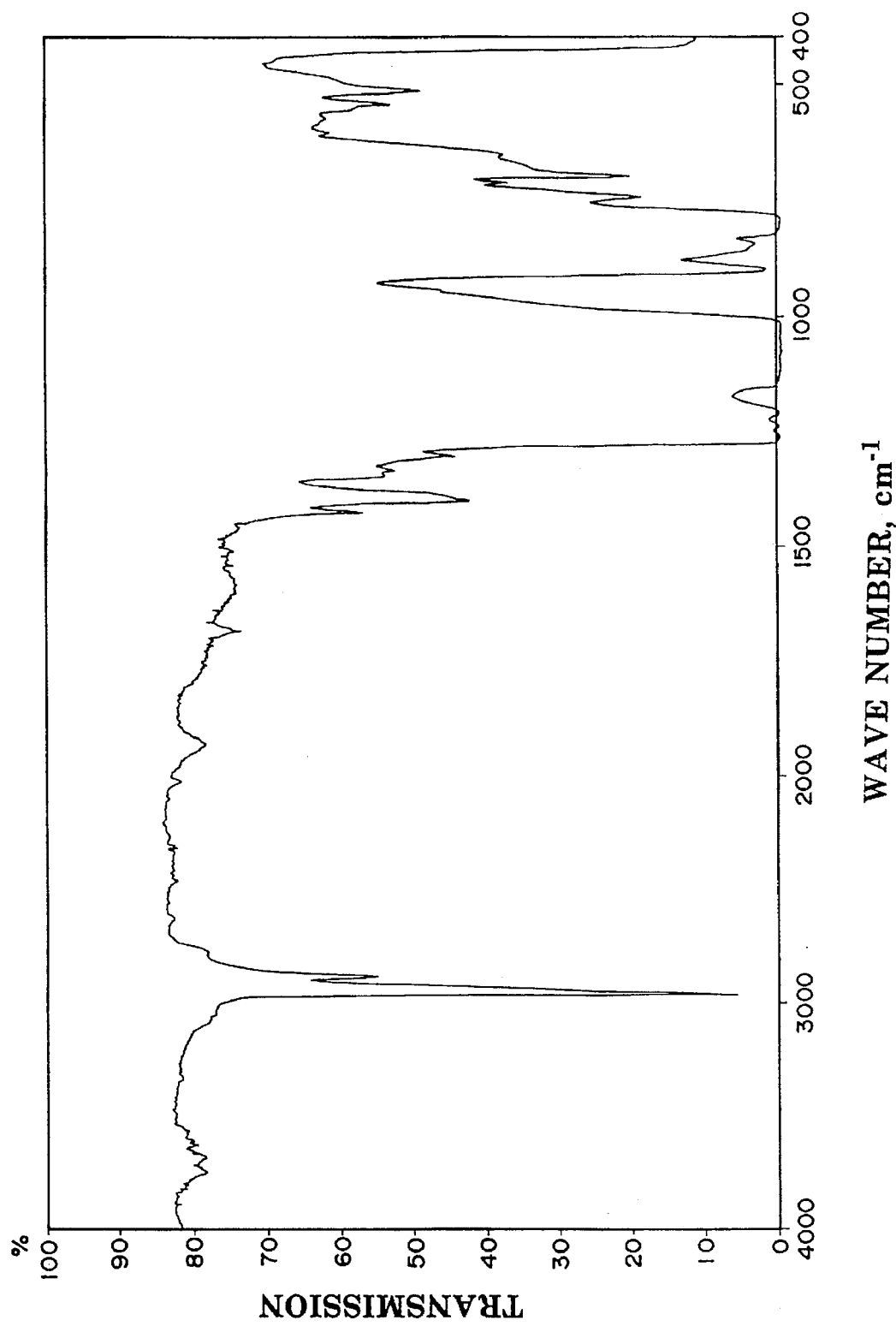

The infrared absorption spectrum of the here obtained product is shown in FIG. 4, in which no absorption band assignable to Si—H can be detected. The results of the NMR spectrometric analyses are shown below.

| $^{19}$F-NMR ($\delta$, ppm, $CF_3COOH$) | |
| --- | --- |
| −5.2 | (s, $CF_3-$) |
| −38.5 | (s, $CH_2CF_2$) |
| −44.1 to −47.4 | (m, $CF_2$) |
| −50.1 | (s, $CF_3-CF_2$) |
| $^1$H-NMR ($\delta$, ppm, TMS) | |
| 0.26 | (m, $CH_3$) |
| 0.95 to 1.23 | (m, Si—$CH_2-$) |
| 1.58 to 2.77 | (m, $CF_2CH_2$) |

COMPARATIVE EXAMPLE 3

Into a three-necked flask of 1 liter capacity equipped with a thermometer, Dimroth condenser and dropping funnel were introduced 59.3 g of a methyl hydrogen polysiloxane expressed by the formula

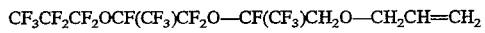

$Me_3Si-O-(-SiMe_2-O-)_p-(-SiHMe-O-)_q-SiMe_3$, in which Me is a methyl group, the subscript p has a value of 95.6 as an average and the subscript q has a value of 43.4 as an average, 0.17 g of a 1% by weight toluene solution of a complex of chloroplatinic acid and 1,1,3,3-tetramethyl-1,3-divinyl disiloxane and 300 g of 1,3-bis(trifluoromethyl) benzene and the mixture in the flask was heated up to 100° to 110° C. under agitation by means of a magnetic stirrer.

In the next place, 189.0 g of a fluorine-containing olefin compound expressed by the formula $CF_3CF_2CF_2OCF(CF_3)CF_2O-CF(CF_3)CH_2O-CH_2CH=CH_2$ were added dropwise through the dropping funnel into the flask taking about 30 minutes and the reaction mixture was further agitated for about 3 hours by keeping the above mentioned temperature to complete the hydrosilation reaction. The amount of the olefin compound was 1.2 times of the stoichiometric amount relative to the silicon-bonded hydrogen atoms in the organohydrogenpolysiloxane.

After completion of the reaction, the reaction mixture was distilled at 120° C. under a pressure of 1 mmHg to remove the solvent and the unreacted olefin compound to obtain 186.9 g of a fluorine-containing organopolysiloxane as the product. It was calculated from the weight difference between the starting organohydrogenpolysiloxane and the above obtained fluorine-modified product that about 90% of the stoichiometric amount of the fluorine-containing olefin compound had reacted with the organohydrogenpolysiloxane.

The compound prepared in this comparative example was subjected to the tests of thermal stability in two ways in the same manner as in Example 1. The results of the constant-temperature decomposition test at 180° C. are shown in FIG. 5 by the curve II, which indicates that the compound was much less stable than the compound prepared in Example 1. Further, the thermogravimetric record of the compound obtained in the same manner as in Example 1 is shown in FIG. 7, which indicatess that the thermal decomposition of the compound started at about 224° C. to be by 20° C. lower than the compound prepared in Example 1.

COMPARATIVE EXAMPLE 4

Into a three-necked flask of 1 liter capacity equipped with a thermometer, Dimroth condenser and dropping funnel were introduced 18.0 g of a methyl hydrogen polysiloxane expressed by the formula $Me_3Si-O-(-SiHMe-O-)_r-SiMe_3$, in which Me is a methyl group and the subscript r has a value of 28 as an average, 0.17 g of a 1% by weight toluene solution of a complex of chloroplatinic acid and 1,1,3,3-tetramethyl-1,3-divinyl disiloxane and 300 g of 1,3-bis (trifluoromethyl) benzene and the mixture in the flask was heated up to 100° to 110° C. under agitation by means of a magnetic stirrer.

In the next place, 189.0 g of a fluorine-containing olefin compound expressed by the formula $CF_3CF_2CF_2OCF(CF_3)CF_2O-CF(CF_3)CH_2O-CH_2CH=CH_2$ were added dropwise through the dropping funnel into the flask taking about 30 minutes and the reaction mixture was further agitated for about 3 hours by keeping the above mentioned temperature to complete the hydrosilation reaction. The amount of the olefin compound was 1.2 times of the stoichiometric amount relative to the silicon-bonded hydrogen atoms in the organohydrogenpolysiloxane.

After completion of the reaction, the reaction mixture was distilled at 120° C. under a pressure of 1 mmHg to remove the solvent and the unreacted olefin compound to obtain 140.3 g of a fluorine-containing organopolysiloxane as the product. It was calculated from the weight difference between the starting organohydrogenpolysiloxane and the above obtained fluorine-modified product that about 84% of the stoichiometric amount of the fluorine-containing olefin compound had reacted with the organohydrogenpolysiloxane.

What is claimed is:

1. A method for the preparation of an organopolysiloxane compound having a 3-(perfluoroalkyl)propyl group represented by the general formula $Rf—CH_2CH_2CH_2—$, Rf being a perfluoroalkyl group having from 1 to 10 carbon atoms, bonded to a silicon atom of the organopolysiloxane which comprises the steps of:

(a) blending an organohydrogenpolysiloxane having, in a molecule, at least one difunctional siloxane unit of the unit formula RSi(H)O, in which R is a monovalent hydrocarbon group free from aliphatic unsaturation having 1 to 10 carbon atoms, and a 3-substituted propene-1 compound represented by the general formula $$Rf—CH_2—CH=CH_2,$$

in which Rf has the same meaning as defined above, with admixture of a catalytic compound for the hydrosilation reaction to form a reaction mixture; and (b) heating the reaction mixture.

2. The method as claimed in claim 1 in which the catalytic compound is a compound of a noble metal element belonging to the VIIIth Group of the Periodic Table.

3. The method as claimed in claim 2 in which the amount of the catalytic compound is in the range from $1\times10^{-3}$ to $1\times10^{-5}$ mole calculated as the noble metal element per mole of the silicon-bonded hydrogen atoms in the organohydrogenpolysiloxane.

4. The method as claimed in claim 1 in which the reaction mixture is diluted by the admixture of an organic solvent.

5. The method as claimed in claim 4 in which the organic solvent is trifluoromethyl benzene or 1,3-bis(trifluoromethyl) benzene.

6. The method as claimed in claim 1 in which the temperature of heating in step (b) is in the range from 40° C. to 160° C.

7. An organopolysiloxane compound having a 3-(perfluoroalkyl)propyl group represented by the general formula $Rf—CH_2CH_2CH_2—$, Rf being a perfluoroalkyl group having from 1 to 10 carbon atoms, bonded to a silicon atom of the organopolysiloxane which is a product prepared by the process comprising the steps of:

(a) blending an organohydrogenpolysiloxane having, in a molecule, at least one difunctional siloxane unit of the unit formula RSi(H)O, in which R is a monovalent hydrocarbon group free from aliphatic unsaturation having 1 to 10 carbon atoms, and a 3-substituted propene-1 compound represented by the general formula $$Rf—CH_2—CH=CH_2,$$

in which Rf has the same meaning as defined above, with admixture of a catalytic compound for the hydrosilation reaction to form a reaction mixture; and (b) heating the reaction mixture.

8. The organopolysiloxane compound as claimed in claim 7 in which the catalytic compound is a compound of a noble metal element belonging to the VIIIth Group of the Periodic Table.

9. The organopolysiloxane compound as claimed in claim 8 in which the amount of the catalytic compound is in the range from $1\times10^{-3}$ to $1\times10^{-5}$ mole calculated as the noble metal element per mole of the silicon-bonded hydrogen atoms in the organohydrogenpolysiloxane.

10. The organopolysiloxane compound as claimed in claim 7 in which the reaction mixture is diluted by the admixture of an organic solvent.

11. The organopolysiloxane compound as claimed in claim 10 in which the organic solvent is trifluoromethyl benzene or 1,3-bis(trifluoromethyl)ben-zene.

12. The organopolysiloxane compound as claimed in claim 7 in which the temperature of heating in step (b) is in the range from 40° C. to 160° C.

* * * * *